(12) United States Patent
Abegglen et al.

(10) Patent No.: US 9,399,546 B2
(45) Date of Patent: Jul. 26, 2016

(54) CAPSULE AND METHOD FOR THE PREPARATION OF A BEVERAGE BY CENTRIFUGATION

(75) Inventors: Daniel Abegglen, Rances (CH); Arnaud Gerbaulet, Oye et Pallet (FR); Jean-Francois Tinembart, Yverdon (CH); Alexandre Perentes, Lausanne (CH)

(73) Assignee: Nestec S.A., Vevey (CH)

( * ) Notice: Subject to any disclaimer, the term of this patent is extended or adjusted under 35 U.S.C. 154(b) by 538 days.

(21) Appl. No.: 13/990,679

(22) PCT Filed: Nov. 25, 2011

(86) PCT No.: PCT/EP2011/071020
§ 371 (c)(1),
(2), (4) Date: May 30, 2013

(87) PCT Pub. No.: WO2012/072509
PCT Pub. Date: Jun. 7, 2012

(65) Prior Publication Data
US 2013/0243911 A1  Sep. 19, 2013

(30) Foreign Application Priority Data
Nov. 30, 2010  (EP) .................................... 10193111

(51) Int. Cl.
*B65D 85/804*  (2006.01)
*A47J 31/22*  (2006.01)

(52) U.S. Cl.
CPC ............. *B65D 85/8043* (2013.01); *A47J 31/22* (2013.01)

(58) Field of Classification Search
CPC ............................ B65D 85/8043; A47J 31/22
See application file for complete search history.

(56) References Cited

U.S. PATENT DOCUMENTS

2009/0220650 A1  9/2009  Ozanne

FOREIGN PATENT DOCUMENTS

| WO | WO2006030461 | 3/2006 |
| WO | WO2008125256 | 10/2008 |
| WO | WO2010063644 | 6/2010 |

*Primary Examiner* — Erik Kashnikow
*Assistant Examiner* — Chaim Smith
(74) *Attorney, Agent, or Firm* — K&L Gates LLP

(57) ABSTRACT

Capsule (1A) designed in particular for the preparation of a beverage in a centrifugal brewing device by feeding liquid in the capsule and rotating the capsule along a central axis (I) to produce centrifugal forces on the liquid traversing the capsule thereby forcing the beverage out of the capsule by such centrifugal forces, wherein the capsule comprises: a body (2) comprising containment walls (3,4), a main opening (6) of central axis (I) closed by a closing wall (8) forming a compartment (7) including beverage ingredients and a flange (5) peripherally bordering the said opening (6), wherein it comprises a perforating wall (9) placed close to the closing wall (8) and comprising perforating means (10-15) for perforating the closing wall (8) when applying a pressure on the transversal closing wall (8) or perforating wall (9).

5 Claims, 4 Drawing Sheets

U.S. Patent  Jul. 26, 2016  Sheet 1 of 4  US 9,399,546 B2

CAPSULE AND METHOD FOR THE PREPARATION OF A BEVERAGE BY CENTRIFUGATION

CROSS REFERENCE TO RELATED APPLICATIONS

The present application is a National Stage of International Application No. PCT/EP2011/071020, filed on Nov. 25, 2011, which claims priority to European Patent Application No. 10193111.1, filed Nov. 30, 2010, the entire contents of which are being incorporated herein by reference.

FIELD OF THE INVENTION

The present invention relates to the field of portioned beverage using capsules for preparing a beverage in a beverage brewing device. The invention more particularly relates to an improved capsule and a method for preparing the beverage.

BACKGROUND ART

The preparation of a beverage by a capsule containing beverage ingredients is known. In general, the capsule is inserted in a beverage production device, such as a coffee machine, liquid is fed in the capsule, the liquid interacts with the beverage ingredients and a beverage is extracted from the capsule under pressure or by gravity.

The preparation of a beverage by using the centrifugation is known. The principle mainly consists in providing beverage ingredients in a container of the capsule, feeding liquid in the receptacle and rotating the receptacle at elevated speed to ensure interaction of liquid with the ingredients while creating a gradient of pressure of liquid in the receptacle; such pressure increasing gradually from the centre towards the periphery of the receptacle. As liquid traverses the ingredients, e.g., ground coffee, extraction of the beverage compounds takes place and a liquid extract is obtained that flows out at the periphery of the receptacle.

The term "capsule" refers to any flexible, rigid or semi-rigid container containing beverage ingredients. Other synonyms to a capsule are: "pod", "pad", "cartridge" or "sachet". The capsule can be single use. The container can also be filled with ingredients by the user to form the capsule just before use.

The term "ingredients" means any suitable beverage substance such as ground coffee, soluble coffee, leaf tea, soluble tea, herbal tea, dairy powder, culinary powder, baby food, other beverage nutritional ingredients and any combinations thereof.

A capsule system using centrifugation forces is described in the following documents: EP2210539, WO2008/148604, WO2008/148650, WO2008/148646, WO2008/148656 and WO2010/026045.

It is known to use a capsule in a beverage brewing device using centrifugation wherein a closure wall of the capsule is removed or perforated for enabling insertion of a liquid injection means and/or beverage extracting means.

However, the opening of the capsule requires the capsule to be inserted in a specific brewing device comprising perforating means. The size and location of the openings are thus dependent essentially on the configuration of the perforating means of the brewing device. Therefore, it is not possible to vary the size and location of the openings such as to adapt the flow conditions to the desired type of beverage.

Furthermore, such means may become blunt over time thus rendering the opening less effective or requiring more force of the device to carry out perforation.

The present invention aims at improving such principle by facilitating and providing more freedom for opening of the capsule.

It can also be required to adapt the openings to the type of capsule (e.g., its volume) and/or to the beverage ingredients (e.g., different coffee blends or tea) and/or type of beverage to prepare (e.g., ristretto, espresso, lungo, americano, etc.). In particular, it can also be useful to use the capsule in a brewing device comprising perforating means as well as in a device having no such perforating means while the capsule can still be opened properly. For instance, it can also be useful to have a capsule that can be perforated manually before insertion.

SUMMARY OF THE INVENTION

The invention provides a solution to such objectives as well as possible additional advantages. The capsule of the invention is designed, in particular for the preparation of a beverage in a centrifugal brewing device by feeding liquid in the capsule and rotating the capsule along a central axis (I) to produce centrifugal forces on the liquid traversing the capsule thereby forcing the beverage out of the capsule by such centrifugal forces, wherein the capsule comprises: a body comprising containment walls, a main opening of central axis (I) closed by a closing wall forming with the containment walls, a compartment containing beverage ingredients and a flange peripherally bordering the said opening, wherein the capsule comprises a perforating wall placed close to the closing wall and comprising perforating means for perforating the closing wall when applying a pressure on the transversal closing wall and/or perforating wall.

The capsule can be configured to be at least partially deformed by a mechanical pressure, such as a pressure exerted by the beverage brewing device or manually; such deformation causing the relative engagement of the closing wall and perforating wall. Therefore, the closing wall and/or perforating wall can be configured for being deformed by the external mechanical pressure in order to provide the perforation of one or more beverage outlets in the closing wall. The capsule may also be configured to be deformed for such perforation by the fluid and/or liquid internal pressure building up in the capsule.

In a first possible mode, the closing wall is placed between the perforating wall and the beverage ingredients. In this mode, the perforating wall may be made deformable inwardly to perforate the closing wall. In particular, the perforating wall is at least partially convex outwardly before deformation.

In a second possible mode, the perforating wall is placed between the beverage ingredients and the closing wall for separating the compartment from said closing wall. For example, the perforating wall can be positioned parallel or inwardly convex to maintain a certain distance with the outer closing wall before perforation.

Preferably, perforating means are placed closer to the peripheral flange of the body than to the central axis (I). Those perforating means more particularly form means for perforating beverage outlets through the closing wall; such outlets being so placed to allow the delivery of the beverage out of the capsule when centrifugation of the capsule takes place. The perforating means are preferably positioned within an area distanced from the flange of between 0.5 and 12 mm, most preferably between 1 and 8 mm. Such distance ensures that the resulting outlets create flow path of liquid through the whole mass of ingredients during centrifugation.

Preferably, these perforating means are formed by a plurality of (perforating) elements in relief protruding from the perforating wall in the direction of the closing wall. The perforating elements are preferably located axially above the compartment but peripherally offset relative to the central axis in order to perforate beverage outlets in the closing wall in areas promoting both upward and outward flow of the beverage in the compartment. These perforating elements are also preferably distributed along at least one circular path. They can be evenly distributed along said path to provide a plurality of evenly distributed outlets in the outlet wall. Preferably, at least 3 elements, preferably at least 4 elements, are provided. Most preferably the number of perforating elements is comprised between 5 and 30. The perforating means can be made of needles, blades or cones or pyramids.

The perforating wall also comprises beverage outlets at the periphery of the perforating wall, said outlets becoming positioned above the compartment and communicating with the compartment upon perforation of the closing wall for release of the beverage through the perforating wall. In a mode, the perforating outlets are provided through the perforating means. It could also be that the perforating outlets are distributed at or around the base of the perforating means.

These characteristics make the distribution of liquid in the capsule across the mass of ingredients more regular, avoid liquid short cuts through the mass of ingredients and thereby improve brewing of the ingredients, e.g., coffee extraction.

Furthermore, in a possible mode an additional perforating element is configured to form a central opening through the capsule. This perforating element is preferably further configured to provide a liquid inlet for insertion of a liquid injector and/or for feeding liquid in the compartment of the capsule. The perforating means for making the beverage outlets and the additional perforating means for making the liquid inlet are preferably present on the same perforating wall. As a result, the perforations of beverage outlets and liquid inlet are provided on the same closing wall.

In an alternative, the perforating element, or element in relief, for the additional perforating means can be present in the body of the capsule, e.g., at a bottom or side wall of the body, for perforating a second closing wall which differs from the first closing wall. For instance, the second closing wall can be placed at the opposite of the first closing wall.

In general, at least one of said perforating elements in relief comprises a through-hole traversing the perforating wall. In a possible mode, each perforating element comprises a through-hole traversing the perforating wall.

Preferably, the at least one closing wall is formed of a gastight membrane. More preferably, the closing wall and body of the capsule are gastight to ensure that there is no significant gas transfer between the compartment of the capsule and the external environment that would affect the freshness of these ingredients before the use (i.e., perforation) of the capsule. More preferably, the compartment further contains inert gas such as nitrogen and/or carbon dioxide and no or a residual amount of oxygen.

The gastight membrane/(s) is/are made of aluminum and/or polymers.

The capsule may further comprise a filter for filtering the beverage. The filter is preferably an element which is separate from the perforating wall. The filter preferably extends in a direction transversal (i.e., substantially perpendicular to the axis I) and above the compartment. The filter may for instance be placed adjacent the perforating wall. It may be external or internal to said wall. The filter is preferably made of a material that resists or deforms under the perforating forces such as a soft and/or elastic fabric (woven or non woven) or a filter paper.

Protrusions or channels can be provided on top of the flange; either directly on it or on portions of flanges of the closing wall and/or the perforating wall connected to the flange of the body. Preferably, the depth of the protrusions and/or channels is of between 0.02 and 0.5 mm, more preferably between 0.05 and 0.3 mm.

The body and perforating wall of the capsule can be formed of aluminum and/or polymer such as PP, PE, PA, PET, PLA, a biodegradable polymer such as a starch-based material or polysaccharides and combinations thereof.

The closing wall is preferably a thin membrane such as aluminum or polymer such as PE, PET, PP and combinations thereof or a metalized biodegradable polymeric foil such as polyhydroxybutyrate-metal-cellophane. The membrane may have a thickness comprised between 10 and 300 microns, more preferably 20 and 150 microns.

In a mode, the perforating means and closing wall are designed to provide a filtering effect through the perforated orifices, such as at the restricted interstice between the edges of the perforated orifices and the surface of the perforating means. For this, the perforating means are preferably formed as a plurality of ridges or truncated pyramids and the closing wall is chosen amongst an aluminium foil of thickness between 20 and 120 microns or a polymer foil such as PP or PE of thickness between 10 and 60 microns or a laminate of aluminium and polymer (PE or PP) or laminate of aluminium and filter paper of total thickness comprised between 20 and 120 microns. In this case, no additional or separate filter layer is necessary.

The invention further relates to the use of the aforementioned capsule in a centrifugal brewing device for preparing a beverage.

The invention further refers to a method for preparing a beverage in a centrifugal brewing device by use of a capsule as afore mentioned and said method comprising:
    feeding liquid in the compartment of the capsule,
    rotating the capsule along the central axis (I) of the capsule to produce centrifugal forces on the liquid traversing the capsule thereby forcing the beverage out of the capsule by such centrifugal forces,
    wherein it comprises a step of perforating the closing wall of the capsule by applying a pressure on the transversal closing wall and/or perforating wall; such pressure being effective for perforating the closing wall by said perforating means.

In the method of the invention, the pressure is applied mechanically before insertion of the capsule in the device or by when in the device by a part of the device moving relatively to and engaging with the perforating wall or closing wall; said part being also rotationally moveable to rotate together with the capsule during centrifugation.

The present invention is generally defined by the appended claims.

BRIEF DESCRIPTION OF THE DRAWINGS:

Additional features of the invention will appear in the detailed description of the figures which follows.

DETAILED DESCRIPTION OF THE DRAWINGS

Figure 1:
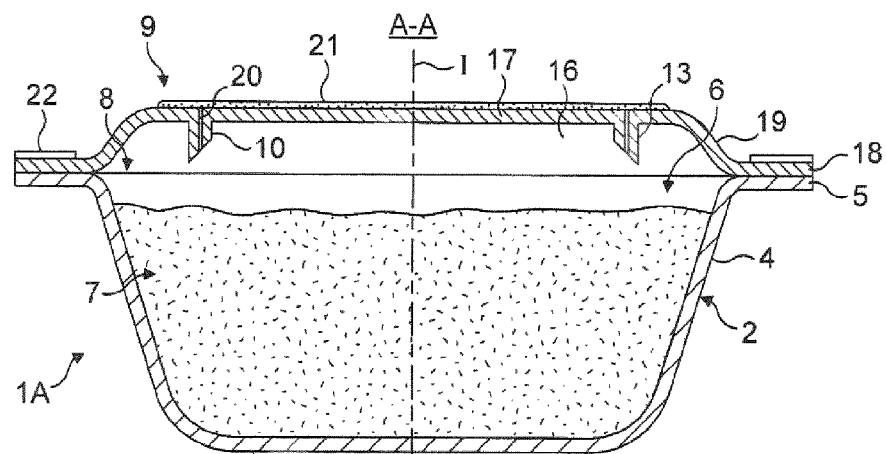
FIG. 1 is a cross-sectional representation of a capsule of the invention along line A-A of FIG. 2.
Figure 2:
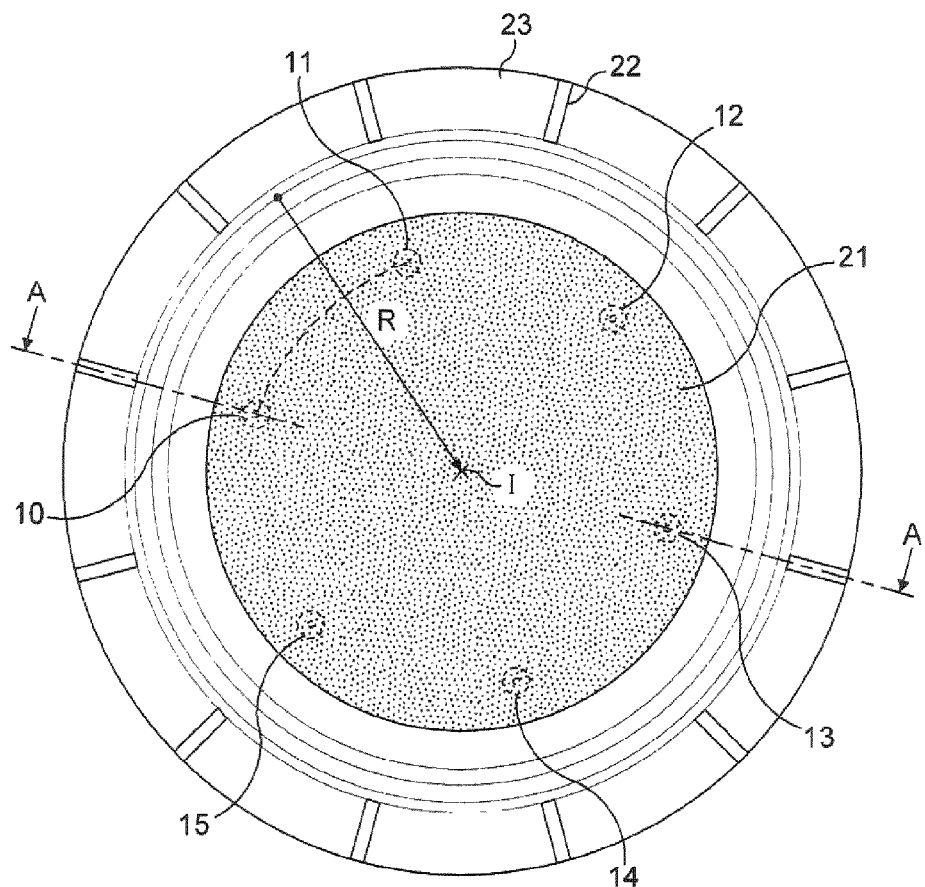
FIG. 2 is a top representation of the capsule of the invention according to a first mode.

A first mode of the capsule is illustrated in FIGS. 1 and 2. The capsule 1A according to this first mode comprises a body 2 having containment walls, namely, a bottom wall 3 and a sidewall 4. The body can be generally cup-shaped. A peripheral flange 5 extends outwardly from the upper portion of the sidewall 4. An opening 6 is defined by the inner edge of the flange. Such opening may be circular. However, the cross section of the opening is not necessarily limited to a circle and can be oval or polygonal depending on the shape of the containment walls. Therefore, the flange forms an annular border surrounding the opening. The body thereby forms a compartment 7 of central axis "I" for receiving beverage ingredients such as a metered amount of ground coffee. The compartment 7 is closed by a closing wall 8 which may be sealed on the flange 5. The compartment 7 is therefore delimited by the containment walls 3, 4 and the closing wall 8.

A perforating wall 9 is also provided nearby the closing wall 8. In particular, the perforating wall 9 covers the closing wall 8 and is sealed to the flange 5, in superimposition with the sealing part of the closing wall.

The perforating wall 9 comprises perforating means such as a series of elements in relief 10, 11, 12, 13, 15. These elements may take various shapes such as spikes, blades, needles, pyramids and the like. They are preferably positioned closer to the flange than to the central axis "I". More preferably, they are positioned within the first length portion representing the first third, most preferably first quarter of the radius "R" of the opening starting from the edge of the flange. The peripheral positioning of the perforating elements 10-15 is important to provide beverage outlets in the closing wall 8 enabling release of the beverage or liquid extract by effect of centrifugation, i.e., when the capsule is driven in high-speed rotation about its central axis "I".

The perforating elements 10-15 are preferably distributed along a circular path. However, another distribution of these elements is possible. The number of elements may vary from 3 to 50. A preferred number is comprised between 4 and 20. A too high number of elements will require an excessive perforating force whereas a too low number may cause inconsistent liquid distribution within the ingredients and possible unbalance of masses in the capsule during rotation and consequently possible vibrations of the device and noises.

In general, the cross-section of the perforating elements is preferably small, in particular, comprised between 0.1 and 5 $mm^2$, more preferably between 0.5 and 2 $mm^2$. The cross-section is here the larger cross-section in the transversal plane of the elements capable of providing an opening in the closing wall. The axial length of the perforating element can be comprised between 2.5 and 15 mm, more preferably 3 and 8 mm. The perforating means may comprise perforating elements of different lengths to reduce the engaged perforating forces in the closing wall, in particular, when the number of elements is high (e.g., above 10 elements). For example, two series of perforating elements of two different lengths can be used.

The perforating wall is positioned relative to the closing wall at a certain distance enabling the protruding of the elements 10-15 in a narrow space 16. The perforating means are preferably positioned within an area distanced from the edge of the flange 5 of between 0.5 and 12 mm, most preferably between 1 and 8 mm. The perforation of the closing wall is here managed by deformation of the perforating wall in the direction of the closing wall such by applying a mechanical pressure on the perforating wall. The perforating wall is shaped as a convex member with a central elevated area 17, a lowered flange area 18 and a transition area 19 of gradually increasing altitude linking the two first areas 17, 18 together. The transition area 19 may be formed of a reduced thickness compared to the thickness of the two other areas 18, 21. The transition area 19 may also be formed as a concertina or bellow to promote a deformation of the perforating wall in direction of the closing wall.

The perforating wall comprises through-holes 20 for draining the beverage out of the capsule. Such holes may be provided through each or only some of the perforating elements 10-15 which in such case form like hollow needles. These holes could as well be placed close but outside the cross-section of the perforating elements. The number of holes can be smaller, equal or larger than the number of perforating elements. The cross-section of the openings can be smaller than the average particle size of the ingredients, for example, ground coffee, thereby forming an in-built filter of the perforating wall. The cross-section of the holes may also be larger than the average particle size.

Figure 3:
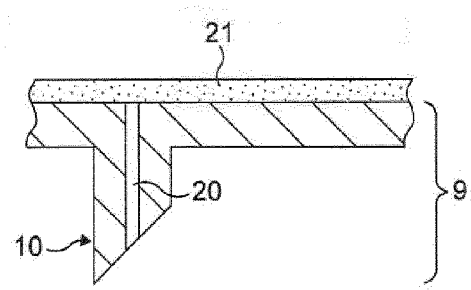
FIG. 3 is a detail representation of the capsule of FIGS. 1 and 2.

A separate filter 21 may be provided to ensure filtering of the beverage. The filter 21 may be placed in a different location, such as in a position adjacent to the perforating wall and external relative to the wall, as illustrated in FIG. 3. In different possible modes, the filter is positioned in the compartment 7 or in the space 16 between the closing wall and perforating wall. The filter may be made of paper or woven or non-woven (natural and/or synthetic) fabric or combinations thereof.

The capsule may further comprise a beverage flow guiding structure such as radial channels 23 and/or protrusions 22 at its flange. Such beverage flow guiding structure can be provided at the external surface of the perforating wall. It could also be formed at the flange between the closing and perforating walls 8, 9 or between the closing wall 8 and the body 2 or also at the bottom side of the flange 5 of the body. In general, the channels and/or protrusions are of small depth (axial dimension) to ensure a sufficiently small restriction of the flow of beverage at the flange. Preferably, the depth is of between 0.02 and 0.5 mm, more preferably between 0.05 and 0.3 mm. The dimension of the channels and/or protrusions can be designed to build a gradient of pressure in the capsule. In such case, the pressure loss through the opening areas created by the channels and/or protrusions is lower than the pressure loss created by the outlets 20 and by the filter.

Figure 4:
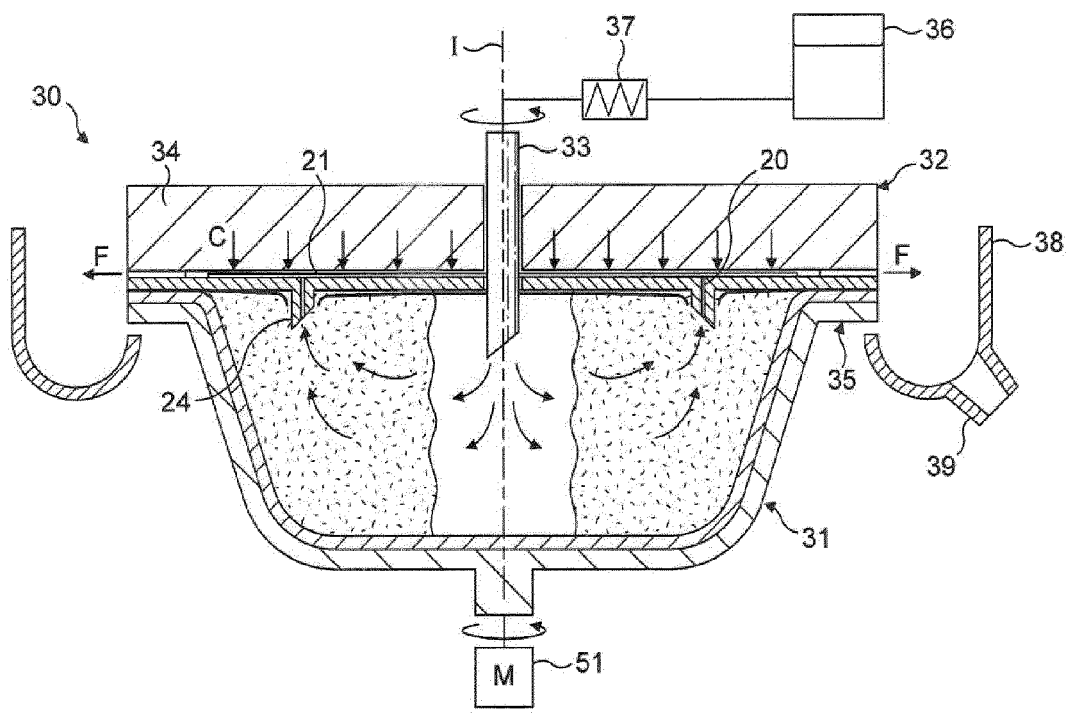
FIG. 4 shows the capsule of FIGS. 1-3 in a centrifugal beverage brewing device.

The operation of the capsule in a centrifugal brewing device is now described in relation to FIG. 4. The capsule is inserted in the device 30, in particular, in a rotationally mounted capsule holder 31 shaped and dimensioned for properly referencing the body of the capsule. A liquid interfacing member 32 is engaged relatively to the perforating wall 9 of the capsule in such a manner to deform the said wall inwardly. As a result, the closing wall becomes perforated by the perforating elements 10-15 in many peripheral locations 24. At the same time, a central inlet may also be perforated by a central injector 33 through both the perforating wall and closing wall. The perforating wall may be formed of a relatively soft or heat and/or liquid softening material enabling to provide liquid tightness in contact with the injector 33.

The brewing unit formed by the capsule holder 31 and liquid interfacing member 32, both retain the capsule fixedly. In particular, a peripheral pinching part 34 of the liquid interfacing member 32 engages with the flange of the capsule in fixed or spring-biased manner. The flange of the capsule becomes pinched between such pinching part and the support part 35 of the capsule holder. Since protrusions and/or channels are present at the flange, a clearance can be maintained enabling the centrifuged beverage to be released through the pinched flange.

For carrying out the beverage extraction, the brewing unit is driven at high-speed rotation (e.g., between 500-10000 rpm), by means of a rotary motor 51 and liquid is fed in the capsule through the injector 33. Such liquid may be heated water coming from a reservoir 36 and circulating in a liquid heater 37 (e.g., thermo-block, cartridge heater or boiler) by means of gravity or pump (not represented). As the brewing unit is rotated, the mass of beverage ingredients is compacted on the inner periphery of the containment walls and liquid traverses the resulting compacted mass and interacts with the ingredients to form a beverage or liquid extract. Such beverage finds its way through the holes 20 provided in the perforating wall and is projected in centrifugal flows "F" through the channels 23 and against an impact wall of a collector 38. The beverage is then collected via a beverage duct 39.

Figure 5:
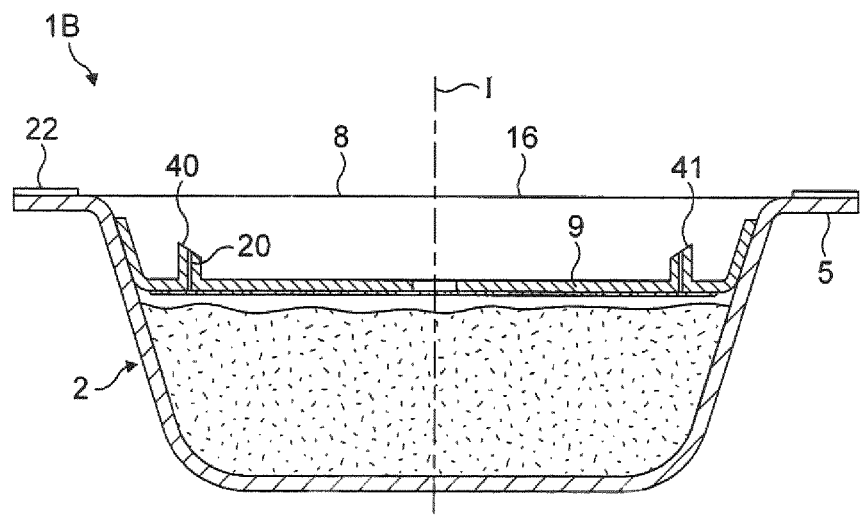
FIG. 5 is a cross-sectional representation of a capsule of the invention according to a second mode.
Figure 6:
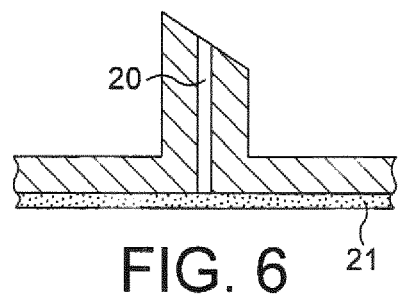
FIG. 6 is a detail representation of the capsule of FIG. 5.

FIGS. 5 and 6 illustrate a second possible mode of the capsule of the invention.

In this capsule, a closing wall 8 is connected to the flange 5 of the body 2 of the capsule to close the capsule, for example, in a gastight fashion. A perforating wall 9 is provided between the closing wall 8 and the cavity for the ingredients. Such wall 9 may, for instance, be formed of an insert which is sealed and/or press-fitted in the cavity of the body. The perforating wall is provided with perforating elements 40, 41 or elements in relief. These elements are directed towards the closing wall 8 in the inter-space 16 present between the two walls. The perforating wall is provided with through-holes 20, for example, provided through the perforating elements. A filter 21 is also provided to cover the through-holes. The filter may be placed between the perforating wall and the ingredients. It should also be noted that the filter could be placed across the inter-space 16. In a way similar to the previous embodiment, protrusions 22 and/or channels can be provided on the flange of the capsule for delimiting a clearance for the centrifuged beverage. Such protrusions 22 and/or channels may be formed on the surface of the closing wall 8 or on the surface of the flange 5 of the body. When on the surface of the flange, this structure preferably protrudes upwardly by simply deforming or traversing the closing wall 8 at the flange. For instance, the wall 8 may be a thin flexible foil such as aluminium, a laminate of aluminium-plastic or plastic.

Figure 7:
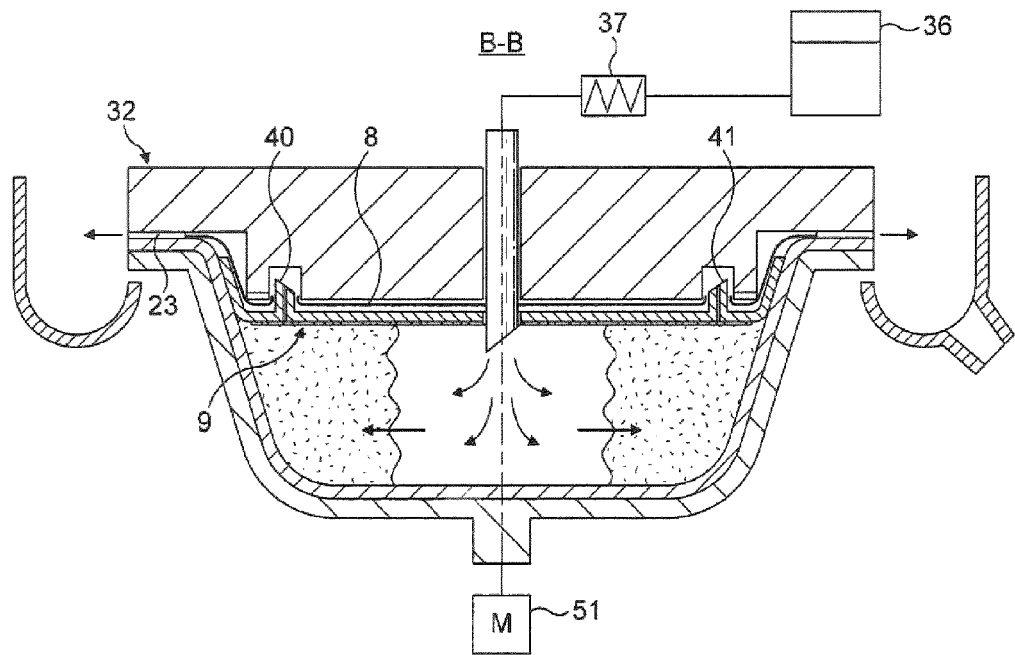
FIG. 7 shows the capsule of FIGS. 5-6 in a centrifugal beverage brewing device.

On FIG. 7, the capsule 1B according to the second mode is shown inserted in the brewing unit of a beverage brewing device. The closing wall 8 is perforated against the perforating elements 40, 41 of the inner wall 9 by effect of the liquid interfacing member 32 engaging and deforming the closing wall 8. The closing wall 8 is deformed inwardly until it reaches the base of the protruding elements. The centrifuged liquid extract leaves the brewing unit between the closing wall and liquid interface member and through the channels 23 provided at the flange of the capsule.

Figure 8:
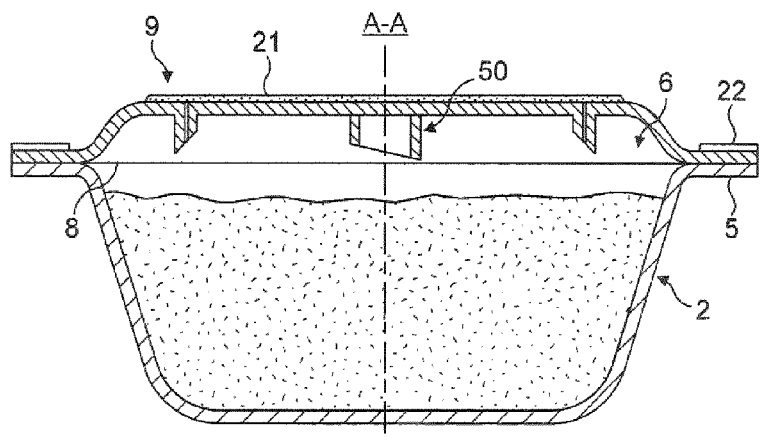
FIG. 8 is a cross-sectional representation of a capsule of the invention according to a third mode.

FIG. 8 illustrates a third embodiment in which an additional perforating means 50 is present on the perforating wall for providing a central inlet aperture in the closing wall 8. The inlet aperture is therefore provided by relative deformation of the perforating wall and/or closing wall. The perforating means 50 may comprise a tubular portion which can be engaged at least partially by the injector of the device. For example, the injector and tubular portion can form a liquid-tight engagement by a close match of their dimensions and shape.

In a possible variant (not illustrated), the perforating means and closing wall are designed to provide a filtering of the perforated orifices. The filtering effect is obtained between the edges of the perforated orifices of the closing wall and the outer surface of the perforating means. The perforating means may thus be formed as a plurality of ridges and/or truncated pyramids. The closing wall is preferably a wall that matches closely with the perforating means to not produce too large orifices that would create a release of the solids outside of the capsule. In particular, the closing wall is chosen amongst an aluminium foil of thickness between 20 and 120 microns or a polymer foil such as PP or PE of thickness between 10 and 60 microns or a laminate of aluminium and polymer (PE or PP) or laminate of aluminium and filter paper of total thickness comprised between 20 and 120 microns.

It should be noticed that other possible variants of the capsule are possible such as solutions using the inside pressure of the liquid or gas in the capsule as resulting from the centrifugal forces to provoke the relative deformation of the perforating and/or closing wall thereby resulting in the perforation of the closing wall. In another variant, the pressure can be obtained by forcing a gas such as air under pressure on the closing and/or perforating wall.

The invention claimed is:

1. A method for preparing a beverage in a centrifugal brewing device using a capsule, the method comprising:
    feeding a liquid in a compartment of the capsule,
    rotating the capsule along a central axis of the capsule to produce centrifugal forces on the liquid traversing the capsule thereby forcing the beverage out of the capsule by the centrifugal forces; and
    perforating a transversal closing wall of the capsule by applying a pressure on the transversal closing wall and/or a perforating wall, the capsule comprises the perforating wall, and the perforating wall comprises a perforating element configured to perforate the transversal closing wall when the pressure is applied on the transversal closing wall and/or the perforating wall.

2. The method according to claim 1, wherein the pressure is applied mechanically before insertion of the capsule in the centrifugal brewing device.

3. The method according to claim 1, wherein the pressure is applied by a part of the centrifugal brewing device moving relatively to and engaging with the perforating wall or the transversal closing wall, the part being rotationally moveable to rotate together with the capsule during centrifugation.

4. The method according to claim 1, wherein the compartment contains beverage ingredients, and the transversal closing wall is located between the perforating wall and the beverage ingredients to close the compartment.

5. The method according to claim 1, wherein the compartment contains beverage ingredients, and the perforating wall is located between the beverage ingredients and the transversal closing wall to separate the compartment from the transversal closing wall.

* * * * *